United States Patent [19]

Sakamoto

[11] 4,361,857
[45] Nov. 30, 1982

[54] AUTOMATIC HEAD TRACKING SYSTEM

[75] Inventor: Hitoshi Sakamoto, Tokyo, Japan

[73] Assignee: Sony Corporation, Tokyo, Japan

[21] Appl. No.: 152,117

[22] Filed: May 21, 1980

[30] Foreign Application Priority Data

May 31, 1979 [JP] Japan .................................. 54-67791

[51] Int. Cl.$^3$ ............................................. G11B 21/10
[52] U.S. Cl. ...................................... 360/77; 360/10.2
[58] Field of Search ....................... 360/10, 11, 70, 75, 360/77, 78

[56] References Cited

U.S. PATENT DOCUMENTS

| | | | |
|---|---|---|---|
| 4,172,265 | 10/1979 | Sakamoto et al. | 360/70 |
| 4,215,362 | 7/1980 | Ravizza | 360/10 X |
| 4,223,358 | 9/1980 | Kubota et al. | 360/75 |
| 4,287,538 | 9/1981 | Sakamoto et al. | 360/10 |
| 4,296,443 | 10/1981 | Sakamoto et al. | 360/10 |

Primary Examiner—Bernard Konick
Assistant Examiner—Donald McElheny, Jr.
Attorney, Agent, or Firm—Lewis H. Eslinger; Alvin Sinderbrand

[57] ABSTRACT

In an apparatus for reproducing video or other information signals recorded in successive parallel tracks extending obliquely on a magnetic tape or other record medium which is adapted to be longitudinally advanced, and in which a magnetic head or transducer is movable in the direction generally along the tracks for reproducing the signals recorded therein and is mounted or supported by a bi-morph leaf or other transducer deflecting device which is operative, in response to the reception of an electrical drive signal, for deflecting the transducer or head in a direction transverse to the direction along the tracks, a head movement detector is attached to the transducer deflecting device for providing a head movement signal in correspondence to deflections of the head in said transverse direction, a dithering signal or oscillation is included in the drive signal along with a head position and track selection control signal, and the envelope of the signals reproduced by the head is synchronously detected for generating a track following error signal which is also included in the drive signal; such synchronous detecting of the reproduced signal envelope is effected with the head movement signal from which there has been eliminated at least the head position and track selection control signal, for example, by subtracting the latter from the output of the head movement detector.

9 Claims, 16 Drawing Figures

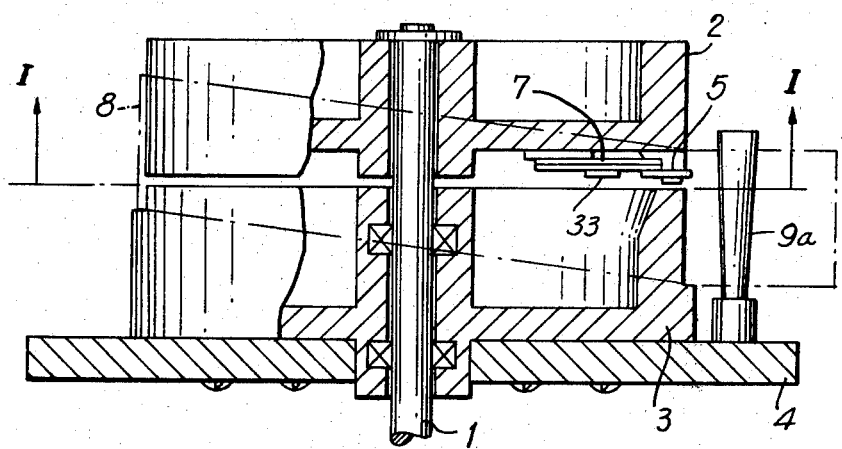
FIG. IA
PRIOR ART
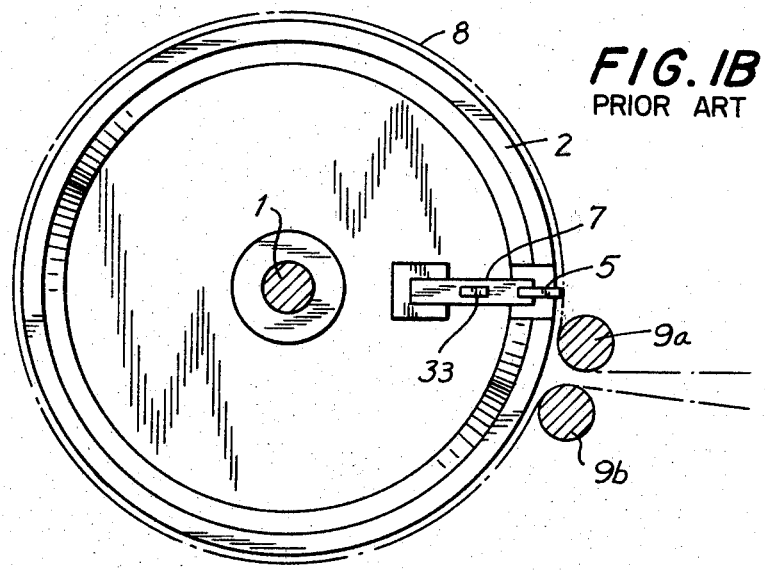
FIG. IB
PRIOR ART

FIG.2
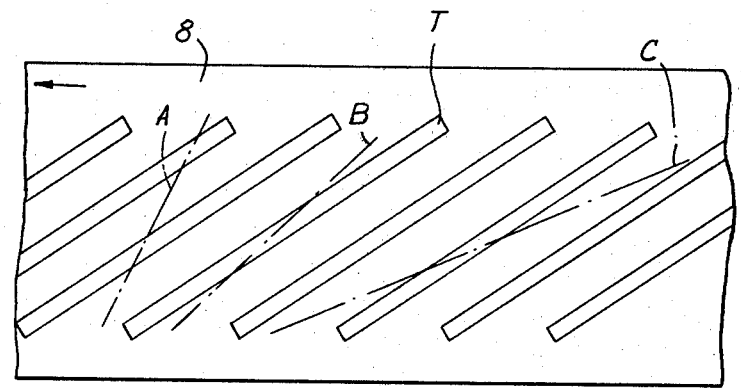
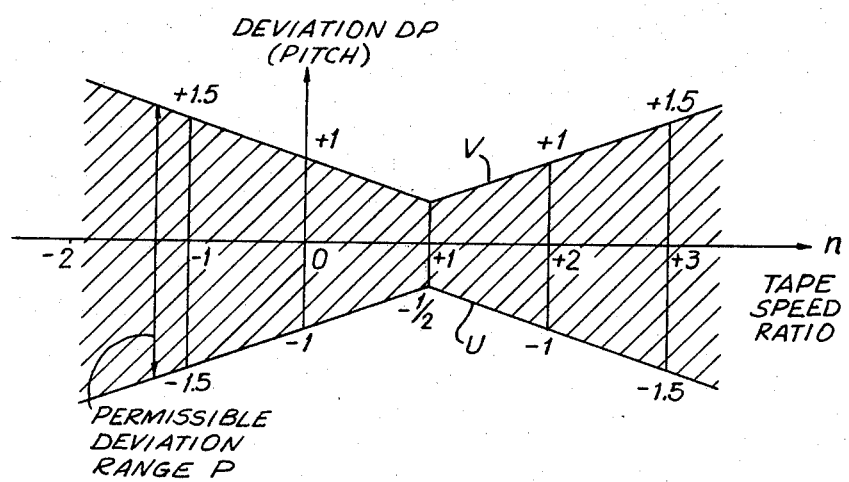
FIG.3

FIG.4A
n=2.5
(FAST-PLAYBACK)
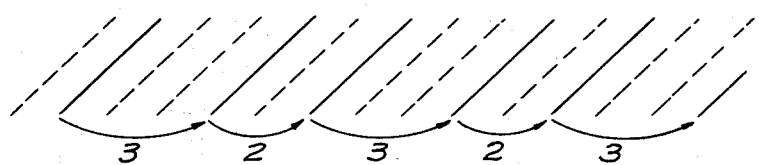
FIG.4B
n=2.25
(FAST-PLAYBACK)
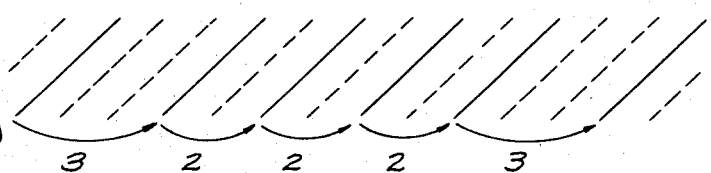
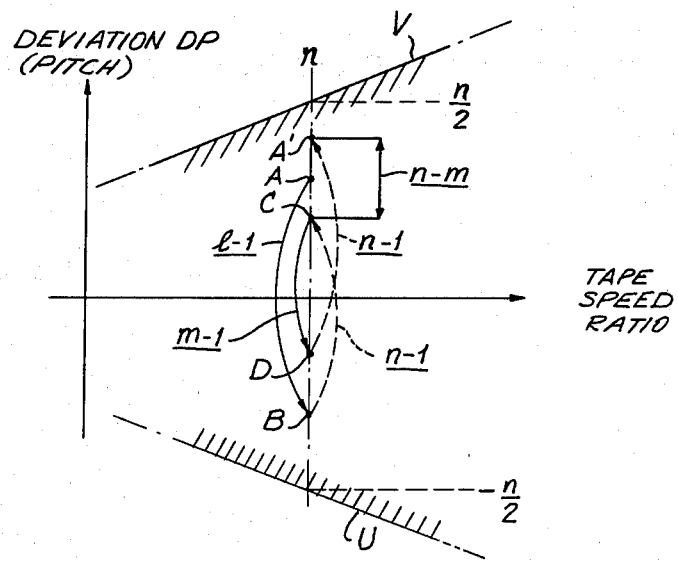
FIG.5

AUTOMATIC HEAD TRACKING SYSTEM

BACKGROUND OF THE INVENTION

This invention relates generally to apparatus, such as, a video tape recorder (VTR) of the so-called "helical-scan type", in which video or other information signals are recorded in successive parallel tracks which are skewed or extend obliquely on a magnetic tape, and more particularly is directed to an improved tracking control system by which a magnetic head or other transducer in such apparatus is made to accurately scan the track or tracks in which the video or other information signals are recorded.

In a helical-scan VTR, the magnetic tape extends helically about at least a portion of the periphery of a guide drum and is adapted to be moved or advanced in the longitudinal direction of the tape while at least a portion of the guide drum is rotated, and the transducer or magnetic head is mounted on a rotated portion of the guide drum so as to rotate with the latter and thereby repeatedly scan across the tape in a path at an angle to the longitudinal direction of the tape. During recording operation of the VTR, the angle between the scanning path, and hence each record track, and the longitudinal direction of the tape is dependent on the rotational speed of the rotary head and also the speed at which the magnetic tape is longitudinally advanced. Accordingly, if the speed and direction of advancement of the magnetic tape are not the same during the reproducing operation as during the recording operation, then the scanning path of the magnetic head during reproducing will not precisely follow or coincide with a record track on the tape during each movement of the head across the tape and, accordingly, the recorded video or other information signals may not be correctly or accurately reproduced.

Various tracking control or servo systems have been proposed for maintaining correct tracking or scanning of the record tracks by the rotary head. In the most desirable of these known arrangements, means are provided for deflecting the head in a direction normal to the plane of its rotation, that is, in a direction which is transverse in repect to the direction along each of the record tracks, and the amount of such deflection is electrically controlled during the movement of the head along each track so as to achieve accurate scanning of the latter. In published Japanese Patent Application No. 9919/1974 (Applicant: Matsushita Electric Industrial Company, Limited), it is generally disclosed to control the amount of deflection of the head in the direction normal to its plane of rotation in dependence on the difference between the speeds of advancement of the tape during the recording and reproducing operations so as to theoretically make possible the correct reproduction of the recorded video signals in the still-motion mode in which the tape is at rest, in the slow-motion mode in which the speed of advancement of the tape is, for example, ¼ or ½ the tape speed for the recording operation, and in the quick-motion mode in which the speed of advancement of the tape is substantially greater than, for example, 2 times, the tape speed, for the recording operation. Further, in published Japanese Patent Application No. 117,106/1977 (Applicant: Ampex Corporation), it is disclosed to detect the amount of deflection of the head required for accurately scanning a record track thereby, and, when the detected deflection approaches the physical limit of that possible with the bi-morph leaf or other transducer deflecting device supporting the head, the electrical drive signal for the bi-morph leaf is controlled to cause the head to scan the next adjacent record track, that is, to effect a so-called "track jump". By reason of such "track jump" it is theoretically possible to effect correct slow-motion reproduction and also reverse-motion reproduction in which, for example, the tape is advanced longitudinally at the same speed as for the recording operation, but in the reverse or opposite direction.

However, in many existing tracking control or servo systems, the amplitude of the deflection of the rotary head or transducer by its transducer deflecting device is not optimized, that is, the maximum required deflection of the head in the non-normal reproducing modes, for example, the still-motion, slow-motion, fast-forward and reverse-motion modes, is not minimized. The foregoing tends to limit the permissible tape speed for reproducing in the fast-forward and reverse-motion modes, and to cause phase deviations or errors in the reproduced signals. Further, the failure to optimize the amplitude of the deflection of the rotary head or transducer by the bi-morph leaf or other transducer deflecting device disadvantageously decreases the durability of the transducer deflecting device and the speed and linearity of its response to the electrical drive or control signal therefor. Moreover, a circuit of undesirably large capacity is required for providing the electrical drive signal to the transducer deflecting device when the deflection amplitude is not optimized.

In U.S. Pat. No. 4,287,538, issued Sept. 1, 1981, and having a common assignee herewith, there is disclosed an automatic tracking control system which optimizes the amplitude of the deflection of the rotary head by its deflecting device for each of the non-normal reproducing modes, and in which a first signal is produced to correspond to the deflection of the bi-morph leaf or transducer deflecting device needed to cause the transducer or head to follow the desired track at a predetermined position therealong, a second signal is produced to correspond to the below value:

$$-\tfrac{1}{2}n + \frac{(1 - n)(100 - d)}{100} + m$$

in which n is the ratio of the tape speed during reproducing to tape speed during recording, d is the percentage of the distance along each track from one end thereof to said predetermined position therealong and m is an integer that is no greater than n and no less than n−1, and a head position and track selection control signal is produced on the basis of the relation of the foregoing first and second signals and is applied to the transducer deflecting device so as to determine the starting position of the transducer or head and, thereby, the next desired track to be followed or scanned thereby. More particularly, in the foregoing automatic tracking control system, the drive signal applied to the transducer deflecting device comprises, in addition to the mentioned head position and track selection control signal, a dithering signal or oscillation and a track following error signal. Such error signal is derived by synchronously detecting the envelope of the reproduced output of the head with a head movement signal obtained from a head movement detector, such as, for example, a strain gauge affixed to the bi-morph leaf carrying the head, so that the head movement signal contains components corresponding to all sources of head deflection transverse to the direction along the tracks, including the head position and track selection control signal, which has a saw-tooth configuration in the non-normal reproducing modes, in addition to the dithering and error signals and mechanical vibrations of the bi-morph leaf itself. Among such components of the head movement signal, at least the components due to the head position and track selection control signal of saw-tooth configuration are not superimposed on the envelope of the signals reproduced by the head. Therefore, such components of the head movement signal due to the head position and track selection control signal are of no significance in synthesizing the error signal by synchronous detection of the envelope of the reproduced signals, but rather deteriorate the error signal thus produced. In an attempt to minimize such deterioration of the error signal, a filter has been provided in the line supplying the head movement signal to the synchronous detector for eliminating the undesired components, including those of saw-tooth configuration, from the signal passing therethrough to the synchronous detector. However, such function of the filter requires that it be carefully designed and constructed, leading to undesirable increases in the cost of the apparatus.

OBJECTS AND SUMMARY OF THE INVENTION

Accordingly, it is an object of this invention to provide an apparatus for reproducing information signals recorded in successive parallel tracks on a record medium with an improved tracking control system which avoids the above-described problems.

More particularly, it is an object of this invention to provide a tracking control system, as aforesaid, by which information signals recorded in successive parallel tracks on a record medium can be correctly reproduced in the various non-normal reproducing modes, and in which an error signal for maintaining accurate tracking of a record track by a head or transducer is synthesized in a manner to avoid deterioration of such error signal by components of the head movement signal which are of no significance in respect to the error signal.

According to an aspect of this invention, in an apparatus for reproducing information signals recorded in successive parallel tracks on a record medium, and in which a head or transducer means is movable along each of the tracks from one end to the other end thereof for reproducing the information signals recorded therein and is mounted on a bi-morph leaf or transducer deflecting means which is operative, in response to an electric drive signal, for deflecting the transducer means in a direction which is transverse to the direction along each of the tracks, a head movement detector is attached to the transducer deflecting means for providing a head movement signal in correspondence to deflections of the head in said transverse direction, a dithering signal or oscillation is included in the drive signal along with a head position and track selection control signal, and the envelope of the signals reproduced by the head is synchronously detected for generating a track following error signal which is also included in the drive signal; such head position and track selection control signal is subtracted from the output of the head movement detector and the resulting signal is employed for synchronously detecting the reproduced signal envelope and thereby reliably obtaining the track following error signal.

The above, and other objects, features and advantages of the invention, will be apparent in the following detailed description of illustrative embodiments thereof which is to be read in connection with the accompanying drawings.

BRIEF DESCRIPTION OF THE DRAWINGS

FIG. 1A is a side elevational view, partly in section, of a head drum assembly of a known video tape recorder (VTR) of the helical-scan type with which a tracking control system according to this invention may be employed;

FIG. 1B is a cross-sectional view taken on the line I—I of FIG. 1A;

FIG. 2 is a plan view of a length of magnetic tape showing recorded tracks and head scanning paths for various playback or reproducing tape speeds;

FIG. 3 is a graph showing the range of necessary maximum head deflections for various ratios n of the tape speed for reproducing to the tape speed for recording;

FIGS. 4A and 4B are diagrammatic illustrations showing the tracks which are traced and the tracks which are jumped in the fast-forward reproducing mode when the reproducing mode when the reproducing tape speed is 2.5 and 2.25 times, respectively, the recording tape speed;

FIG. 5 is a graph illustrating the deflecting motion of the head when the ratio of tape speed for reproducing to the tape speed for recording is n;

DESCRIPTION OF THE PREFERRED EMBODIMENTS

Figure 6:
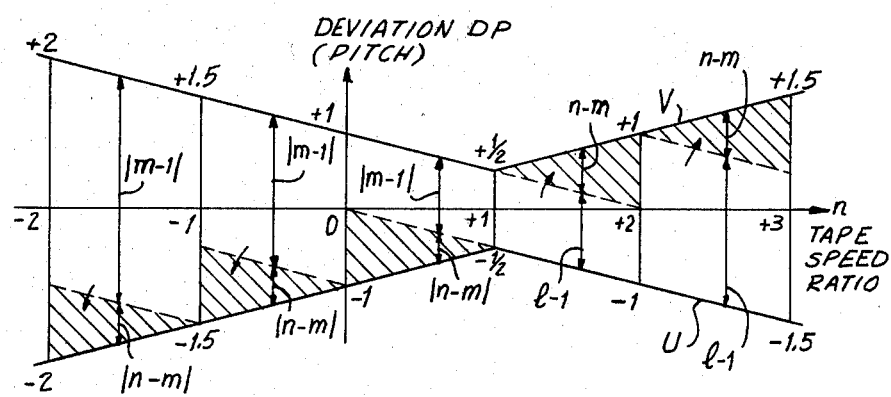
FIG. 6 is a graph showing a group of boundary lines for determining the head jump or flyback condition.

Referring to the drawings in detail, it will be seen that FIGS. 1A and 1B show a rotary head drum assembly of a known one-head VTR of the helical-scan type. The rotary head drum assembly is shown to include an upper rotary drum 2 which is rotated by a drive shaft 1 and a lower stationary drum 3 which is fixed on a chassis 4 of the VTR concentric with drive shaft 1 so as to be opposite upper drum 2 with a small gap therebetween. A magnetic head 5 is attached on the lower surface of upper drum 2 through a bi-morph leaf 7 that is an electromechanical transducer formed of piezoelectric elements. Head 5 rotates with upper drum 2 at a predetermined rotational speed and is deflected perpendicularly to its scanning path, or transversely with respect to the longitudinally direction of each recorded track, by means of the bi-morph leaf 7.

A magnetic tape 8 is wrapped helically around the outer peripheries of upper drum 2 and lower drum 1 over an arc of almost 360° and is guided by tape guides 9a and 9b to form a so-called "Omega" loading format, as shown on FIGS. 1A and 1B. During recording operation, tape 8 is advanced longitudinally at a predetermined speed, so that video or other information signals are recorded by head 5 in a series of parallel magnetic tracks T at a predetermined slant angle to the longitudinal direction of the tape 8, as shown in FIG. 2.

In playback or reproducing operation with tape 8 being transported at the recording speed, an accurate video signal can be reproduced with a tracking servo system which includes a drum servo and/or capstan servo for adjusting the rotary phase of the head 5 so as to make the head correctly trace or scan the successive recorded tracks. In a playback mode employing an arbitrary tape speed which is different from the recording speed, both the phase and slant angle of the head scanning path do not coincide with the phase and slant angle, respectively, of the recorded track T. Some examples are shown on FIG. 2, in which dot-dash lines A, B and C respectively represent scanning paths of the head for reproducing in the reverse-motion, still-motion and 2.5/1 fast-forward motion modes.

Therefore, in the arbitrary speed playback mode, the vertical position of the head 5 must be changed by deflection of bi-morph leaf 7 in response to a control or drive signal so as to achieve initial phase error compensation and slant tracking error compensation. In addition to such compensations, it is necessary to effect tracing track selecting in order to perform overlap-tracing or interval-tracing. Overlap-tracing is required in a slow-motion playback mode employing a tape speed slower than the recording speed, and in which the head repeatedly traces or scans a recorded track and then the head scans the next track on the tape. Interval-tracing is required in a fast-motion playback mode employing a tape speed faster than the recording speed, and in which one or several tracks are skipped and the head only scans the tracks at intervals. Thus, when compensating for phase and slant errors, the optimum one of the recorded tracks must be traced to correctly effect such overlap-tracing or interval-tracing while ensuring that the vertical position of the head will not go beyond the smallest possible maximum permissible deflection for the tracking operation. The alteration of the track being traced from one track to the next desired one is hereinafter called "track jump".

Next, the condition for track jump, that is, the optimum condition to minimize the amplitude of head deflection or deviation, will be considered.

As noted above, tracking error compensation includes both a phase error compensation and a slant error compensation. In respect to the phase error compensation, when the head 5 is going to scan one of the paths A, B or C shown by dot-dash lines on FIG. 2, a maximum deflection of $\pm\frac{1}{2}$ pitch (one pitch is equal to the distance between adjacent record tracks) is the most that may be required to move the head onto the starting point of a recorded track to be traced. In other words, when the head is centered between adjacent tracks at the start of its scanning movement, the phase error is maximum and may be corrected by a $\pm\frac{1}{2}$ pitch deflection. If the arrangement is used that the head can be deflected to both sides of the track T by bi-morph leaf 7 which is controlled to selectively bend upward and downward from its neutral position shown in FIG. 1A, there a head deflection amplitude of one pitch, in its peak to peak value, is necessary for effecting the phase compensation irrespective of the tape speed during reproducing.

On the other hand, the slant compensation required to ensure that, once the head begins to trace a desired track, it will trace that one track from beginning to end, will vary in accordance with the tape speed. When the ratio of playback tape speed to the recording speed is represented by n, the required slant compensation is as follows:

$$(n-1) \text{ pitch (in the case of } n \geq 1) \tag{1}$$

$$\text{or } (1-n) \text{ pitch (in the case of } n < 1) \tag{2}$$

Consequently, a phase compensation of 1 pitch and a slant compensation of $(n-1)$ pitches may be required for correction of the scanning path of the head. Since the phase compensation has no relation to the playback tape speed, the phase and slant compensations are independent of each other. Thus, the necessary maximum amplitude P of the head deflection is represented by the sum of the compensation components as follows:

$$P=[(n-1)+1] \text{ pitch for } n \geq 1 \tag{3a}$$

$$P=[(1-n)+1] \text{ pitch for } n < 1 \tag{3b}$$

FIG. 3 shows the range of necessary maximum head deflections deduced from equations (3a) and (3b). As is apparent from FIG. 3, since the bi-morph leaf 7 is equally deflectable in the upward and downward directions, the deflection amplitude P of equations (3a) and (3b) may be equally distributed between an upper range and a lower range at opposite sides of a base surface (corresponding to the axis of abscissa of FIG. 3) on which bi-morph leaf 7 supporting the head is mounted. The upper boundary line V and the lower boundary line U of the range are represented by $$P=\pm\frac{1}{2}[(n-1)+1] \text{ for } n \geq 1 \tag{4a}$$

or $$P=\pm\frac{1}{2}[(1-n)+1] \text{ for } n<1 \tag{4b}$$

The optimum deflection is achieved by bending bi-morph leaf 7 in the range defined between the upper and lower boundary lines V and U. The foregoing is a necessary condition to reduce the required deflection amplitude of the bi-morph leaf to the absolute minimum.

A method of controlling the track jump, which satisfies the necessary conditions of FIG. 3, will now be considered.

When the playback speed ratio n is an integer, interval-tracing, in which one or several recorded tracks are skipped, is effected with a track jump of n-pitches after each tracing or scan of a track. For example, in 2/1-fast-motion reproduction, tracing at intervals of 2-pitches or on alternate tracks is effected. Accordingly, when the playback speed ratio n is an integer, the "track jump pitch" or "trace pitch", that is, the distance between adjacent tracing tracks, may be represented by n pitches. However, when the speed ratio n is not an integer, for instance, if n is equal to 1 divided by an integer, one of the recorded tracks is repeatedly traced n-times, and then a track jump of one pitch, that is, to the next track, is effected. Therefore, when the speed ratio n is not an integer, the "track jump pitch" cannot be represented by n.

Since the head is not allowed to jump from one track to another in the middle of tracing or scanning a track, the track jump pitch is always an integral multiple of one pitch. Accordingly, when the speed ratio n is not an integer, n must be represented by two integers l and m as follows:

$$n = \frac{l \times X + m \times y}{X + y} \quad (5)$$

where l and m are determined by the inequality $(n+1) > l > m (n-1)$ and X and y are appropriate integers. The following table shows values of l and m obtained from equation (5) for various ranges of n:

TABLE

| VALUES OF l AND m FOR VARIABLE n | | |
|---|---|---|
| 1 > n > 0 | l = 1 | m = 0 |
| 2 > n > 1 | l = 2 | m = 1 |
| 3 > n > 2 | l = 3 | m = 2 |
| 0 > n > −1 | l = 0 | m = −1 |
| −1 > n > −2 | l = −1 | m = −2 |

The numbers l and m represent the necessary track jump pitches and X and y represent the number of times the jumps of pitches l and m are respectively effected. The combination of the track jumps of pitches l and m carried out X-times and y-times, respectively, in each unit trace mode, serves to provide a track jump of n-pitches on the average, and thereby achieves playback at the speed ratio n.

For example, when n is equal to 2.5 for the 2.5/1-fast-motion playback mode, equation (5) leads to l=3, m=2, X=1 and y=1. As illustrated on FIG. 4A, in that case, the tracking operation is performed by carrying out alternate single track jumps of 3-pitches and 2-pitches. Thus, for the 2.5/1 fast-motion playback mode in which n=2.5, each cycle of the tracking operation involves two scans during which there is a track jump of 3-pitches and then a track jump of 2-pitches, respectively, leading to a total track jump of 5-pitches for two track jumps, or an "average" track jump of 2.5 pitches.

When n is equal to 2.25, equation (5) leads to l=3, m=2, X=1 and y=3. As shown on FIG. 4B, in that case, each cycle of the tracking operation involves a single track jump of 3-pitches and then, a track jump of 2-pitches which is repeated 3-times. In this case, each cycle of the tracking operation achieves a total track jumps of 9-pitches in 4 track jumps leading to an "average" track jump of 2.25 pitches.

Therefore, in the arbitrary speed playback, predetermined numbers of track jumps of l pitches and m pitches are carried out to achieve the desired tracking operation. In certain particular cases, when the playback speed ratio n is an integer or $|n| < 1$, l or m becomes zero. The actual amounts of head deflection needed to effect the track jumps of l pitches and m pitches are l−1=m pitches and m−1 pitches, respectively, as the head jumps from the concluding end of a track being scanned to the starting end of a next track to be scanned, and the vertical positions of the concluding and starting ends of adjacent recorded tracks agree with each other on the peripheral surface of the head drum assembly. In other words, in the absence of any deflection of the head by its supporting bi-morph leaf, a so-called track jump of 1-pitch is effected as the head moves from the concluding end of one track to the starting end of the next track.

The head deflections of l−1=m pitches and m−1 pitches are hereinafter called an "m-jump" and "(m−1)-jump", respectively. The larger one of the m-jump and (m−1)-jump, considered in absolute values thereof, is referred to as the "large jump" and the smaller one is referred to as the "small jump", from which it follows that the m-jump is the larger jump in the case of n>1 and the (m−1)-jump is the large jump in the case of n<1.

Next, consideration will be given to the sequence or condition of the track jumps needed to maintain deflection of the head within the range shown in FIG. 3. As shown in FIGS. 4A and 4B, after a large jump or small jump is carried out to move the head onto the beginning or starting end of a desired recorded track, the head scans such track while the slant compensation of $|n-1|$ pitches is effected. The deflections of the bi-morph leaf for the track jump and the slant compensation are carried out in opposite directions from each other.

FIG. 5 illustrates the deflecting motion of the head when the playback tape speed ratio n is, for example, 2.5. The ordinate of the graph of FIG. 5 represents head deviation $D_P$ in units of pitch. When the head is at the point A at the concluding end of a recorded track, a large jump of (l−1) or m pitches is carried out to deflect the head onto the beginning end of the next desired track to be traced, that is, the head is deflected to the point B, as shown by a solid line on FIG. 5. Then, the head traces the track while the (n−1)-slant compensation is effected, as shown by a dotted line. At the concluding end of the track, the head has been deflected at the point C. After that, a small jump of m−1 pitches is carried out as indicated by a solid line, to deflect the head to the point D which is at the beginning end of the next desired track to be traced. Then, the head traces the last-mentioned track while the (n−1)-slant compensation is effected, as shown by a dotted line, to the concluding end of the track where the deflected head is at the point A. The foregoing represents the deflecting cycle, and such sequential deflecting operations are repeated.

The deflecting motion of the head shown on FIG. 5 corresponds to the trace mode shown on FIG. 4A, and in which the large jump (3-pitches) and the small jump (2-pitches) are carried out alternately. In other trace modes wherein the small jump or large jump is repeated several times, for example, as shown in FIG. 4B, the small jump (or large jump) and the subsequent trace are repeated several times to reach the deflection point A.

In determining the deflecting cycle, the below conditions (1) and (2) have to be observed.
Condition (1)

When the large jump, for example, from point A to point B, is carried out, point B must not be beyond the lower boundary line U of FIG. 3 or FIG. 5. The deflection for the large jump is l−1=m pitches when the speed ratio n is greater than 1, the large jump is permissible only when the point A at which the head is situated before the large jump, is above a position that is $l-1$ or m pitches from the lower boundary line U. If the deviation of the head from its neutral or undeflected position before the large jump is represented by $D_p$ (pitches), the head is deflected by the large jump to a point represented by $(D_p-m)$ pitches and which must be above the lower boundary line U. Thus, $(D_p-m)>$ line U or $(D_p-m)> -\frac{1}{2}n$ so that, $$D_p > -\frac{1}{2}n + m \qquad (6).$$

The above inequality (6) gives a condition necessary for the large jump in the case of $n>1$.

As for the slant compensation of $(n-1)$ pitches necessary for proper tracing after the large jump, $(n-1)$ is seen to be less than $(l-1)$ from equation (5). Accordingly, if the deviation $D_p$ of point A before the large jump satisfies the above inequality (6), the deviation at the end of tracing, for example, at point C, is never beyond the permissible range.

In the case of $n<1$, the large jump is effected by a deflection of $(m-1)$ pitches, where m is a negative integer. Thus, in the same manner as above, the head is deflected by the large jump from point $D_p$ to a point $(D_p-m+1)$ pitches, which must be below the upper boundary line V. Thus, $(D_p-m+1)<$ line V or $(D_p-m+1) < (-\frac{1}{2}n+1)$ so that, $$D_p < -\frac{1}{2}n + m \qquad (7).$$

Condition (2)

For the small jump, for example, from the point C to the point D, the deflection is equal to $(m-1)$ pitches, in the case of $n>1$. The slant compensation of $(n-1)$ pitches which has been effected before the small jump is greater than the deflection of $(m-1)$ pitches for the small jump, so that the point D after the small jump is never beyond the point B at the beginning of the tracing before the small jump.

As the slant compensation of $(n-1)$ pitches necessary for the tracing after the small jump is greater than the small jump deflection of $(m-1)$ pitches, care must be taken that the deviation at the end point A' of the tracing is not beyond the upper boundary line V. The distance between the points C and A' is equal to $(n-m)$ pitches. Consequently, the small jump is permissible only when the deviation point C before effecting the small jump is situated below a position that is $(n-m)$ pitches distant from the upper boundary line V. If the head is positioned at a point $D_p$, before the small jump, the head is deflected by the small jump and the following tracing to the point $D_{p'}-(m-1)+(n-1)$ which must be below the line V. Thus, $D_{p'}-m+n<$ line V or $D_{p'}-m+n < \frac{1}{2}n$ so that, $$D_{p'} < -\frac{1}{2}n + m \qquad (8).$$

The above inequality (8) gives a condition necessary for the small jump in the case of $n>1$.

In the case of $n>1$, the small jump is effected by a deflection of pitches. Thus, in the same manner as above, it can be determined that after the small jump and the subsequent tracing, the head is at the point $D_{p'}-m+(n-1)$, which must be above the lower boundary line U. Thus, $D_{p'}-m+n-1>$ line U or $D_{p'}-m+n-1 > \frac{1}{2}n-1$ $$D_{p'} > -\frac{1}{2}n + m \qquad (9).$$

As a result, a group of boundary lines defining the conditions for changeover between the large jump and the small jump are expressed as follows:

$$D_{p'} = -\frac{1}{2}n + m \qquad (10),$$

where m is an integer given by the condition of $n \geq m \geq n-1$. The boundary lines are shown by dotted lines in FIG. 6, and are seen to be distant by $(l-1)$ pitches, that is, the deflection for the large jump when $n>1$, from the lower boundary line U or distant by $(m-1)$ pitches, that is, the deflection for the large jump when $n<1$, from the upper boundary line V. Therefore, hatched, triangular regions satisfy the above inequalities (6) and (7). Thus, when the head is deviated or deflected to lie in the hatched regions at the concluding end of a track being scanned, a large jump must be effected to reset the head to the beginning end of the next desired track.

The dotted boundary lines in FIG. 6 are also distant by $(n-m)$ pitches from the upper and lower boundary lines V and U for $n>1$ and $n<1$, respectively. Therefore, the regions except the hatched regions in the permissible range between lines U and V satisfy the above inequalities (8) and (9).

Therefore, the dotted lines in FIG. 6 define the boundaries for determining whether a large jump or a small jump is next required. When the head deviation point at the concluding end of a traced track crosses one of the boundaries in the direction shown by arrows on FIG. 6, a large jump is required, and when the head deviation point does not cross one of the boundaries, a small jump is required. If the foregoing conditions are observed, the head deflection never exceeds the maximum, permissible range of FIG. 3, which minimizes the head deviation or deflection of the bi-morph leaf.

Figure 7:
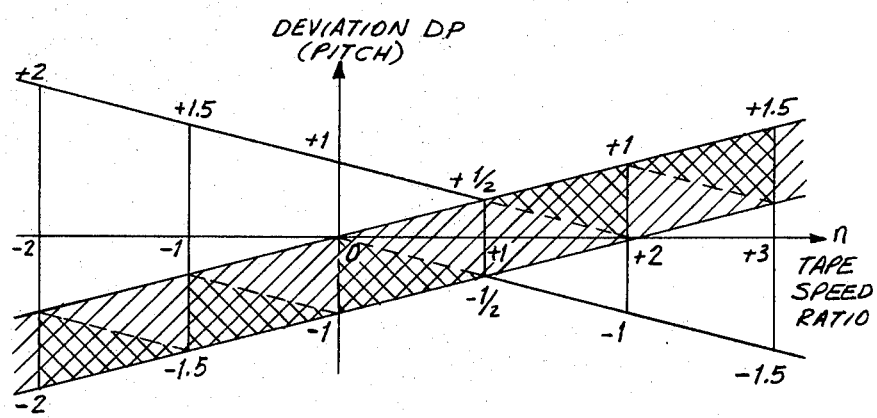
FIG. 7 is a graph similar to that of FIG. 3, but in which the necessary head deflections for various ratios n are broken down into components for compensating for initial phase errors and for compensating for slant scanning errors, respectively.

The jump conditions of FIG. 6 may be considered from another point of view. More particularly, FIG. 7 shows a graph in which the necessary maximum amplitude of head deflection shown on FIG. 3 is broken down into its two components, namely, a component for the phase compensation ($\pm\frac{1}{2}$ pitches) and a component for the slant compensation ($n-1$ pitches). In FIG. 7, the phase compensation component of $\pm\frac{1}{2}$ pitches, that is, a deflection of one pitch from peak-to-peak, is shown by a hatched portion. The remaining portion or region corresponds to the slant compensation component. Further, if the hatched regions of FIG. 6, each of which is called as "fraction-region" and has a varying range of $(n-m)$, are overlapped on FIG. 7, the resulting cross-hatched "fraction-regions" are completely contained within the hatched portion. Accordingly, it is apparent that the phase error caused by the fraction $(n-m)$ can be convered by the phase compensation.

The above equation (10) represents boundaries to judge the jump to be effected on the basis of the head deviation at the point just before a track jump, that is, at the concluding end of a traced track. When it is required to judge the jump to be effected on the basis of the head deviation at any other point along a scanned track, for example, at a point distant by d percent from the beginning end of the track being traced or scanned before the jump, the remaining slant compensation, defined by $$\frac{(n-1)(100-d)}{100},$$

must be subtracted from the expression for $D_p$ in equation (10). Accordingly, the general expression for the boundaries is changed as follows:

$$D_P = -\tfrac{1}{2}n + \frac{(1-n)(100-d)}{100} + m. \qquad (11)$$

Figure 8:
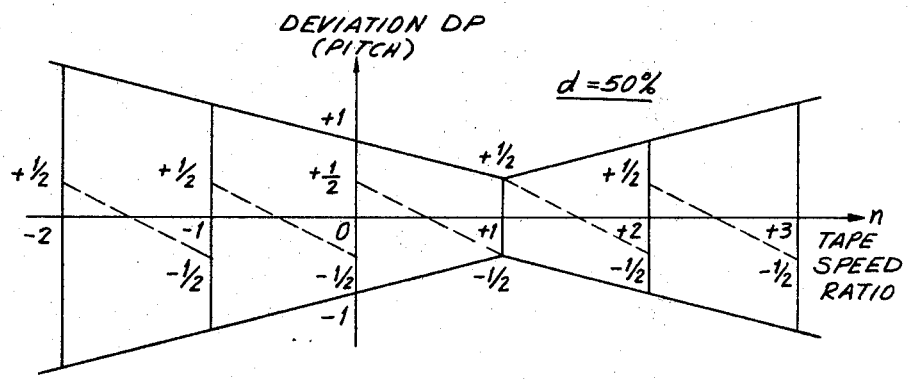
FIG. 8 is a graph similar to that of FIG. 6, but showing another group of boundary lines for determining the head jump or flyback condition on the basis of the head deflection at a position which is distant by $d=50\%$ of the track length from the first or starting end of a scanning track.
Figure 9:
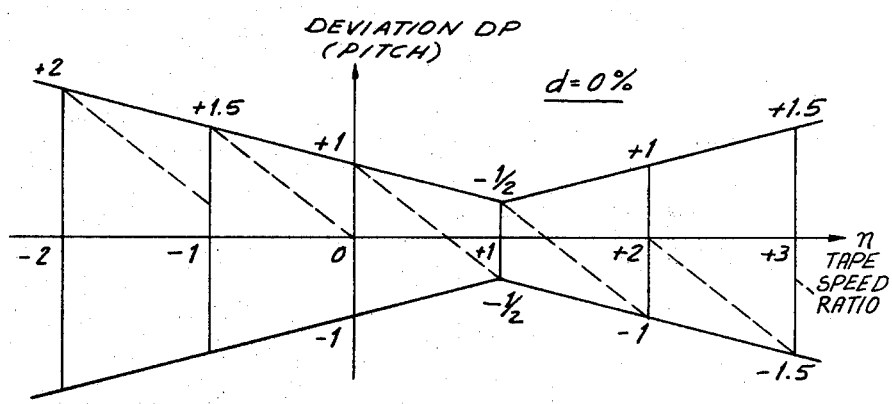
FIG. 9 is a graph similar to FIG. 8, but for $d=0\%$.

FIG. 8 is a graph showing a group of boundaries (dotted lines) for judging the jump (large or small) to be effected on the basis of the head deviation at a point along the track being scanned which is spaced by 50% of the track length from the beginning or starting end of the track. In other words, FIG. 8 is a view similar to that of FIG. 6, but in which the basis is the deviation or deflection of the head when at the middle of the track being scanned, rather than at the concluding end of such track. FIG. 9 is another graph similar to that of FIG. 8, but showing boundaries in dotted lines for judging whether to effect a large jump or a small jump on the basis of the deflection of the head at the commencement of a scanning path or track.

The judgment on the basis of head deviation at the concluding end of a track being scanned is advantageous for the tracking operation in the case of an abrupt change in the playback situation, for example, an abrupt change in the tape speed. It is, however, disadvantageous in that only a relatively short time is available for the jump or flyback movement of the head between the scanning of the concluding end of one track and the scanning of the beginning of the next desired track.

Figure 10:
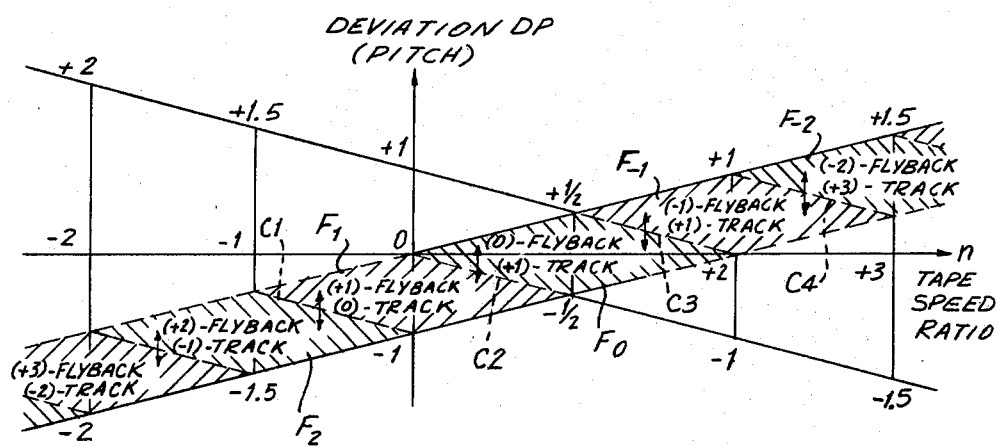
FIG. 10 is a graph showing shared regions each representing necessary head flyback amplitude for track jump or track alteration.

Referring now to FIG. 10, it will be seen that the graph thereon shows shared regions each representing the necessary head flyback amplitude for the track jump which is judged as to its condition (large jump or small jump) on the basis of the head deviation at the concluding end of the track being scanned.

As shown in FIG. 5, after a large jump (from A to B) or a small jump (from C to D), the next desired track is traced with the head being deflected by the slant compensation of $(n-1)$ pitches. The head deviation at the judging point (C or A') always comes in a region, such as, one of the hatched regions $F_2$, $F_1$, $F_0$, $F_{-1}$, $F_{-2}$—on FIG. 10, which is spaced from the lower boundary line by $(n-1)$ pitches for $n \geq 1$, or spaced from the upper boundary line by $(1-n)$ pitches for $n < 1$. The deviation of the judging point, that is, the deflection of the head at the concluding end of a track being scanned, varies within a respective one of the regions $F_2$, $F_1$, $F_0$, $F_{-1}$, $F_{-2}$, etc. depending on the tape speed and direction, that is, the value of n.

In the case of $n > 1$, when the judging point comes across one of the boundary lines defined by equation (10), as at $C_3$ or $C_4$ on FIG. 10, in the direction toward the adjacent upper triangular region, for example, when the judging point crosses line $C_3$ in the direction from $F_0$ toward $F_{-1}$, a large jump of $(1-1)$ or m pitches should be carried out to reset the head. When the judging point comes across the boundary line toward the adjacent lower triangular region, for example, across the line $C_3$ toward region $F_0$, a small head jump of $(m-1)$ pitches is carried out to reset the head. In the case of $n < 1$, a large jump is effected to reset the head when the judging point comes across one of the boundary lines $C_1$ or $C_2$ in the direction toward the adjacent lower triangular region, and a small jump is effected when the judging point comes across the line $C_1$ or $C_2$ in the direction toward the adjacent upper triangular region.

The deflections of the head by m pitches and $(m-1)$ pitches, respectively, for the large jump and the small jump are shown on FIG. 10 as "flyback" amplitudes in terms of the respective numbers of pitches with a positive or negative sign attached to each. Pairs of horizontally adjacent triangular regions on FIG. 10 have the same flyback amplitudes as each other, and are combined to form the diamond-shaped regions $F_2$, $F_1$, $F_0$, $F_{-1}$, $F_{-2}$, etc. The positive and negative signs represent the direction of the flyback movement of the head. The positive sign indicates that the bi-morph leaf 7 in FIG. 1A is bent or deflected upward by the prescribed number of pitches and the negative sign indicates that the bi-morph leaf 7 is bend downward by the prescribed number of pitches. "(0) flyback" means that the track jump to reset the head on to the beginning of the next desired track is performed without any flyback movement or deflection of the bi-morph leaf but automatically with the tape running. Each of the numbers in parenthesis next to the legend "track" on FIG. 10 indicates the number of pitches to a next desired track, that is, the "trace pitches" for the respective trace mode.

A head tracking control circuit which performs the above-described tracking operation will now be described with reference to FIG. 11.

Figure 11:
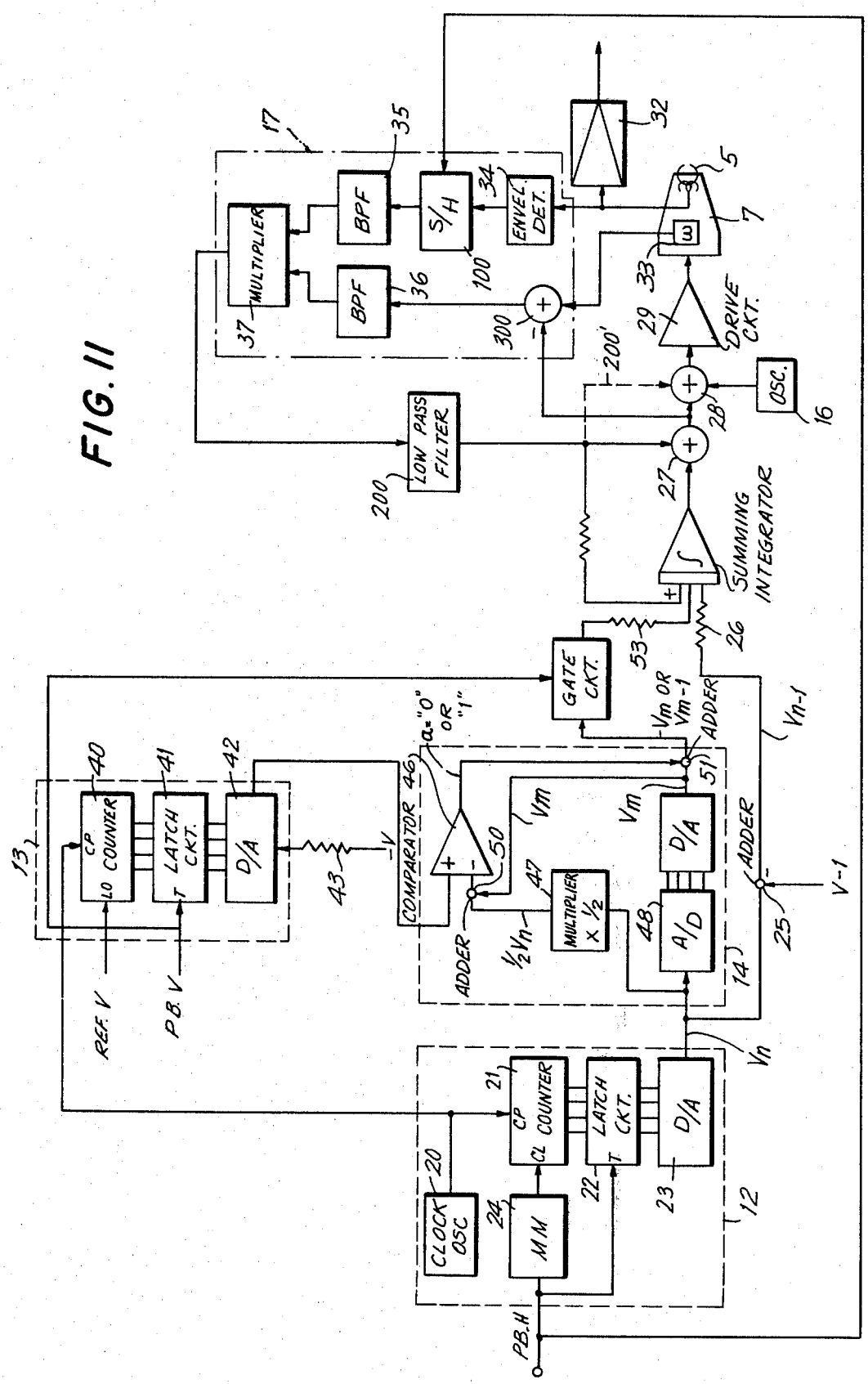
FIG. 11 is a block diagram of a head tracking control circuit according to an embodiment of this invention.

The tracking control circuit of FIG. 11 generally includes a tape speed detecting circuit 12, a head deviation detecting circuit 13, a flyback voltage forming circuit 14, an integrator 15 and an error signal forming circuit 17.

The frequency or period of the horizontal synchronizing signal in the reproduced video signal varies in accordance with the playback tape speed. The reason is that the relative speed between the head and the recorded track on the tape changes in accordance with the tape speed, which results in a variation of the frequency of the reproduced horizontal synchronizing signal. Although the head scanning path is corrected by deflection of the bi-morph leaf to effect the slant compensation, such compensation never causes frequency variation of the horizontal synchronizing signal as the head is deflected by the bi-morph leaf transversely with respect to the scanning path. Thus, the tape speed ratio n can be detected from the frequency of the reproduced horizontal synchronizing signal.

In FIG. 11, the reproduced horizontal synchronizing signal PB.H which is suitably separated from the output of head 5 is supplied to the tape speed detecting circuit 12. The detecting circuit 12 includes a clock pulse generator 20 for generating clock pulses of a predetermined frequency, a counter 21 for counting the clock pulses, a latch circuit 22 for holding the output of the counter for a predetermined period and a digital-to-analog (D/A) converter 23.

The clock pulse generator 20 generates clock pulses of a suitably high frequency, for example, 14 MHz. The clock pulses are supplied to a clock terminal CP of counter 21, which counts the clock pulses at horizontal scanning intervals. A reset pulse of a predetermined width synchronized with the reproduced horizontal synchronizing signal is supplied to a reset or load terminal R of counter 21 through a monostable multivibrator 24 to reset the counter. The output of counter 21 is supplied to latch circuit 22. As the reproduced horizontal synchronizing signal is supplied to a trigger terminal T of latch circuit 22, the output of counter 21 is read in the latch circuit 22 just before counter 21 is reset, and such output of counter 21 is held in latch circuit 22 for a timer interval until the next horizontal synchronizing signal. The output of latch circuit 22 is supplied to digital-to-analog converter 23 which provides a voltage output signal $V_n$ corresponding to the tape speed ratio n. A bias voltage $V-1$ corresponding to the tape speed ratio of $n=-1$ for the reverse mode of reproduction is added to the voltage signal $V_n$ in an adder 25 to form the voltage $V_{n-1}$ in which corresponds to the slant compensation factor or component $(n-1)$.

The voltage signal $V_{n-1}$ is supplied through a resistor 26 to one of the inputs of summing integrator 15 which provides, as its output, a ramp voltage having a predetermined slant corresponding to the slant compensation. The ramp voltage is supplied to a drive circuit 29 through adders 27 and 28. A signal for wobbling or dithering the bi-morph leaf 7 at a predetermined frequency $f_0$ is supplied from an oscillator 16. Thus, the drive circuit 29 provides, as its output, a ramp voltage on which the wobbling or dithering signal is superposed. The bi-morph leaf 7 is driven in response to the output of drive circuit 29, so that the scanning path of head 5 is corrected by the slant compensation to follow a desired track even though the tape running speed for reproducing does not equal the recording tape speed, and the head is wobbled transversely with respect to the longitudinal direction of the scanning path.

As a result, the RF or FM signal reproduced by the head 5 is subjected to an amplitude modulation at the wobbling or dithering frequency $f_0$. The reproduced RF signal from the head 5 is fed to a video signal reproducing system (not shown) through an amplifier 32 and is also supplied to the error signal forming circuit 17. The bi-morph leaf 7 is provided with a head movement detector, shown in the form of a strain gauge 33, on one of the surfaces thereof, for detecting the deflection thereof. The output of strain gauge 33 is a head movement signal which is fed to error signal forming circuit 17 and which includes components corresponding to all of the sources of movement of head 5 in the direction transverse with respect to the record tracks.

The error signal forming circuit 17 is shown to include an envelope detecting circuit 34, band-pass filters 35 and 36, a synchronous detector constituted by a multiplier 37, and a sample and hold circuit 100. The reproduced RF signal is supplied from head 5 to envelope detecting circuit 34, from which an amplitude-modulation component included in the RF signal is obtained. The output of detecting circuit 34 includes information regarding the amount and direction of the tracking error of the actual scanning path relative to the recorded track, and also partially includes amplitude-modulated components due to undesirable mechanical vibrations, such as, resonant and transient vibrations.

The output of detecting circuit 34 is applied to sample and hold circuit 100 which also receives the horizontal synchronizing signal PB.H separated from the reproduced signal. Thus, circuit 100 samples the output of envelope detecting circuit 34 at each horizontal synchronizing signal and holds the sampled value until the receipt of the next horizontal synchronizing signal. The value sampled by circuit 100 is supplied to one input of multiplier 37 through band-pass filter 35. Another input of multiplier 37 receives the output of strain gauge 33 through band-pass filter 36. The output of strain gauge 33 includes the frequency component $f_0$ of the wobbling signal and the mentioned undesired mechanical vibrations, both of which serve as the modulating wave for the amplitude modulation and do not include any information with regard to the tracking error. Therefore, correlation between the modulating wave (the output of the strain gauge 33) and the modulated wave (the output of the detecting circuit 34) is considered in multiplier 37 which functions as a synchronous detector. The in-phase components ($f_0$-component and the undesired mechanical vibration component) included in both inputs to multiplier 37 are eliminated therethrough and it is intended that only the tracking error signal should be detected therefrom. The tracking error signal is supplied from multiplier 37 through a low pass filter 200, which has notches at the wobbling or dithering frequency $f_0$ and at the frequency $2f_0$, to an input of adder 27 for adding, in the latter, to the ramp voltage or sawtooth signal from integrator 15. Thus, the deflection amplitude of the bi-morph leaf 7 is controlled so that the scanning path of the head 5 substantially coincides with the recorded track.

When the tracing or scanning of a recorded track is finished, a head flyback motion or reset motion is imparted to the bi-morph leaf 7 so as to reset the head to the beginning of a next desired track in accordance with the track jump condition. The track jump condition is decided on the basis of an output $V_d$ of the head deviation detecting circuit 13, which detects the head deviation amount at the concluding end of a track being scanned or traced. The output $V_d$ of detecting circuit 13 is fed to the flyback voltage forming circuit 14, which operates in accordance with the flyback-conditions shown in FIG. 10.

Figure 12:
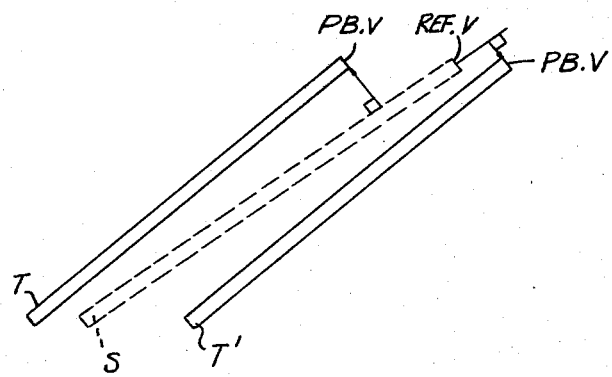
FIG. 12 is a chart used for explaining the phase relationship between a reproduced vertical synchronizing signal and a reference vertical synchronizing signal.

The head deviation amount or distance from the neutral position of the head may be detected by measuring the phase difference between the reproduced vertical synchronizing signal PB.V and an external reference vertical synchronizing signal Ref.V. As shown on FIG. 12, if the head were fixed at its neutral position, for example, by excluding the control signal from the bi-morph leaf 7, the head would scan along a scanning path S indicated in dotted lines and which has a slant in accordance with the tape running speed. The reference vertical synchronizing signal (ref. V) appears at a time corresponding to the head reaching the concluding end of the scanning path. The signal (ref. V) may be formed by a rotational phase detector (not shown) associated with the rotary upper drum 2.

When a control signal applied to the bi-morph leaf 7 causes the head to trace the recorded track T or T' by performing the slant compensation and the phase compensation, the head is deflected transversely with respect to the scanning path S. Thus, the phase of the reproduced vertical synchronizing signal PB.V at the concluding end of the track T leads with respect to the phase of the reference signal (ref. V) by an amount proportional to the head deviation. Conversely, the phase of the signal PB.V at the concluding end of the track T' lags with respect to the phase of the signal (ref. V). Thus, the amount and direction of the head deviation can be determined by detecting the phase of the reproduced vertical synchronizing signal PB.V with respect to the reference vertical synchronizing signal (ref. V).

Returning to FIG. 11, it will be seen that the head deviation detecting circuit 13 may include a counter 40 for counting the output pulses of clock pulse generator 20, a latch circuit 41 for holding the output of counter 40 and a digital-to-analog converter 42 for changing the output of latch circuit 41 to an analog value or voltage $V_d$. The output of clock pulse generator 20 is supplied to a clock terminal CP of counter 40, and a load terminal L0 of the counter receives the reference vertical synchronizing signal (ref. V) to load or offset the counter 40 with a predetermined value which is a central value corresponding to the phase of the reference signal (ref. V). The counter 40 counts the positive or negative phase difference between the reference signal (ref. V) and the reproduced signal PB.V on the basis of the clock pulse.

The output of counter 40 is supplied to latch circuit 41 which, at a trigger terminal T, receives the signal PB.V. Thus, the output or count of counter 40 is read in latch circuit 41 at the reproduced signal PB.V and indicates the phase difference. The output of latch circuit 41 is provided to the digital-to-analog converter 42, in which the voltage signal $V_d$ corresponding to the phase difference, that is, the deviation $D_p$ of the head, is formed. The digital-to-analog converter 42 is provided with a bias voltage $-V$ through a resistor 43 to offset the output thereof so that the voltage signal $V_d$ becomes zero when the phase difference between (ref. V) and PB.V is zero. The voltage signal $V_d$ is fed to the flyback voltage forming circuit 14.

The flyback voltage forming circuit 14, as shown on FIG. 11, includes a comparator 46, a multiplier 47, an analog-to-digital converter 48 and a digital-to-analog converter 49. The voltage signal $V_n$ corresponding to the tape speed ratio n is supplied to A/D converter 48 from tape speed detecting circuit 12. The digital value obtained from the A/D converter 48 is fed to the D/A converter 49, which provides, as its output, a voltage signal $V_m$ corresponding to the integer m determined by the condition $n \geq m \geq n-1$. The voltage $V_m$, when applied to bi-morph 7, can deflect the head 5 by m pitches. The voltage $V_m$ is supplied to an adder 50 in the negative polarity $(-V_m)$ so as to be subtracted from the output of multiplier 47.

The voltage signal $V_n$ representing the speed ratio n is supplied to the multiplier 47 which multiplies by $\frac{1}{2}$ so that an output $\frac{1}{2} V_n$ is produced. Thus, adder 50 provides an output voltage signal $\frac{1}{2} V_n - V_m$ corresponding to a head deviation of $(\frac{1}{2}n - m)$ pitches. The voltage signal $\frac{1}{2} V_n - V_m$ is supplied to an input terminal $(-)$ of comparator 46 which, at its other input terminal $(+)$ receives the voltage signal $V_d$ from circuit 13 representing the head deviation. In comparator 46, the voltages $V_d$ and $-\frac{1}{2} V_n + V_m$ are compared with each other. The output a of comparator 46 has the below two states or values:

(1) $a=1$ when $V_d < -\frac{1}{2} V_n + V_m$
(2) $a=0$ when $V_d > -\frac{1}{2} V_n + V_m$ Thus, comparator 46 judges whether or not the head deviation $D_p$ at the concluding end of a tracing track has passed one of the boundaries expressed by equation (10) and which is shown by the dotted lines in FIG. 6. For example, in a playback mode employing a tape speed ratio n within the range from 1 to 2, the existence of state (1) of output a shows that the head deviation at the judging point is in the triangular region $F_0$ of FIG. 10, and the existence of state (2) shows that the head deviation is in the triangular region $F_{-1}$.

Output a of comparator 46 is supplied to an adder 51 with negative polarity and with a level corresponding to a head deflection of one pitch when $a=1$. The output $V_m$ of D/A converter 49 is also supplied to adder 51 so that the output of adder 51 is a voltage signal $V_{m-1}$ in state (1), that is, when $a=1$, and another voltage signal $V_m$ is obtained in state (2) or when $a=0$. The voltage signals $V_{m-1}$ and $V_m$ correspond to the flyback pitch $m-1$ (small jump) and the flyback pitch m (large jump), respectively. The voltage signal $V_{m-1}$ or $V_m$ is supplied as a flyback signal to integrator 15 through an analog gate circuit 52 and a resistor 53. The gate circuit 52 is controlled by the reproduced vertical synchronizing signal PB.V so that gate 52 passes the signal therethrough for an instant, for example, 1 msec., after scanning of a track is finished. The time constant for the integration effected in integrator 15 with respect to the flyback signal is made substantially smaller than that with respect to the signal $V_{n-1}$ from adder 25 corresponding to the slant compensation factor $n-1$. The time constants for the integration are determined by the resistances of the resistors 26 and 53.

As a result, the bi-morph leaf 7 is deflected by the ramp voltage corresponding to the slant compensation $n-1$ and thereafter files back or jumps by the prescribed number of pitches at the reproduced vertical synchronizing signal.

Figure 13:
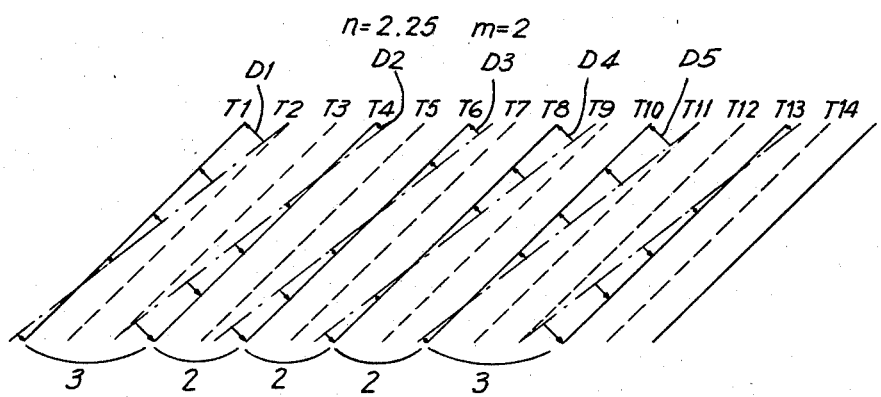
FIG. 13 is a chart showing the tracing mode for a fast-forward reproducing mode with the tape speed ratio $n=2.25$.
Figure 14:
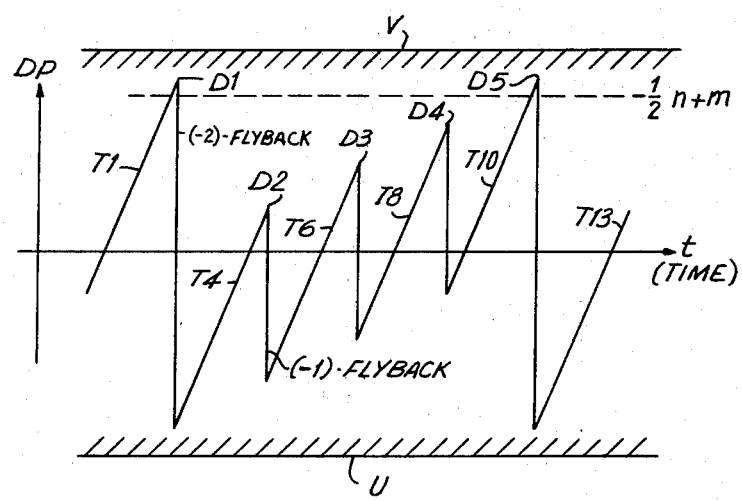
FIG. 14 is a waveform of a supply voltage applied to a bi-morph leaf for head deflection in the manner shown on FIG. 13.

FIG. 13 illustrates the tracing cycle or pattern for the 2.25/1-fast playback mode, and FIG. 14 shows the waveform of the drive voltage to be supplied to the bi-morph leaf 7 for obtaining such tracing cycle. The waveform of FIG. 14 corresponds to the head deviation.

As shown by dot-dash lines in FIG. 13, in the 2.25/1-fast playback mode, each head scanning path has a slant error of 1.25-pitches in respect to the recorded tracks $T_1$, $T_2$ - - - - . It is assumed that the head is deflected by $D_1$ pitches at the concluding end of the scanning of track $T_1$ for correcting the phase error and slant error, which results in the condition $D_1 > -\frac{1}{2}n + m$. Accordingly, the output a of comparator 46 of FIG. 11 is in state (2), that is, $a=0$. Therefore, a flyback voltage $V_m$ corresponding to $m=2$ pitches is produced and is applied to bi-morph leaf 7 to deflect the head 5 by $-2$ pitches onto the beginning end of the track $T_4$. Then, track $T_4$ is traced or scanned with the slant compensation of 1.25 pitches. At the concluding end of track $T_4$, the head deviation changes to $D_2$, which results in the condition $D_2 < -\frac{1}{2}n + m$. Accordingly, the output a of comparator 46 goes to state (2), that is, $a=1$. As a result, a flyback voltage $V_{m-1}$ corresponding to $m-1=1$ pitch is produced to cause flyback of the head 5 of $-1$ pitch onto the beginning end of the track $T_6$. After that, the scanning of a track and the flyback of $-1$ pitch are repeated two times, and then, the flyback of $-2$ pitches is carried out, as shown on FIG. 14.

It will be appreciated that strain gauge 33 responds to any and all movements of bi-morph leaf 7 from its neutral or non-deflected position. Therefore, in the non-normal reproduction modes of the apparatus of FIG. 11, the head movement signal or output of strain gauge 33 includes signal components in addition to those resulting from the dithering or wobbling signal of oscillator 16 and from mechanically induced vibrations. Such additional signal components of the output of strain gauge 33 include components due to the output of integrator 15 which constitutes a head position and track selection control signal of sawtooth configuration. The head position and track selection control signal is derived by integrator 15 from the ramp voltage $V_{n-1}$ from adder 25 which determines the head position and from the voltage signal $V_m$ or $V_{m-1}$ passed by gate 52 at the vertical synchronizing signal for selecting the next track to be scanned. Among the various components of the head movement signal from strain gauge 33, at least the components due to deflection of bi-morph leaf 7 by the head position and track selection control signal of sawtooth configuration from integrator 15 are not superimposed on the envelope of the signals reproduced by head 5. Therefore, such components of the head movement signal due to the head position and track selection control signal are of no significance in synthesizing the error signal by synchronous detection of the envelope of the reproduced signals, but rather deteriorate the error signal thus produced. It is difficult to minimize such deterioration of the error signal by means of the filter 36 in the line supplying the head movement signal to the synchronous detector or multiplier 37.

Therefore, in accordance with the present invention, at least the components of the head movement signal due to the head position and track selection control signal from integrator 15 are eliminated from the head movement signal as applied from strain gauge 33 to filter 36, and thence to multiplier or synchronous detector 37. More particularly, as shown on FIG. 11, output of adder 27 is applied to an inverting or negative input of an adder 300 which has another input receiving the output of strain gauge 33. It will be appreciated that adder 300 acts to subtract at least the head position and track selection control signal of sawtooth configuration from the head movement signal or output of strain gauge 33 as applied to filter 36 for transmission to multiplier 37. Thus, the output of adder 300 (acting as a subtractor) includes substantially only components due to the wobbling or dithering signal and due to and undesired mechanical vibrations, both of which serve as the modulating wave for the amplitude modulation of the output of head 5 and which do not include any information with regard to the tracking error.

Therefore, when correlation between the modulating wave, as typified by the output of adder 300, and the modulated wave issuing from detecting circuit 34 is considered in multiplier 37 and the in-phase components in both inputs to multiplier 37 are eliminated therein, only the accurately determined tracking error signal remains as the output from multiplier 37. Since at least the head position and track selection control signal of sawtooth configuration is subtracted from the head movement signal or output of strain gauge 33 in accordance with this invention, no difficulty is experienced in the design and construction of filter 36 to pass essentially only the wobbling or dithering frequency $f_0$ and the associated side band components which are effective for synthesizing the error signal by means of multiplier 37.

In the embodiment of the invention shown on FIG. 11, the tracking error signal at the output of filter 200 is applied to adder 27, and it is the output of adder 27 which is applied to the negative or inverted input of adder 300 for subtraction from the output of strain gauge 33. However, as shown by broken lines at 200; on FIG. 11, in a modification of the illustrated embodiment of the invention, the output of filter 200 may be applied to a further input of adder 28, so that only the output of integrator 15 is applied to the negative input of adder 300. Of course, in such modification, the adder 27 may be eliminated.

Although the invention has been described and illustrated as applied to an apparatus in which the head movement signal is derived from the strain gauge 33 fixed on bi-morph leaf 7, it will be appreciated that the head movement signal may be otherwise derived, for example, from a bi-morph generator which similarly responds to deflection or movement of the reproducing head. It is also to be noted that, although the circuit arrangement shown on FIG. 11 for providing the head position and track selection control signal is preferred in that it optimizes the deflection of the bi-morph leaf 7 for the various non-normal reproducing modes, the present invention may be readily and advantageously applied to other tracking control systems which selectively determine the successive tracks to be scanned by a rotary head or heads in the non-normal reproducing modes.

It will be appreciated that, in the preferred tracking control system shown on FIG. 11, the accuracy of the tracking error signal derived from multiplier 37 is enhanced by the presence of the sample and hold circuit 100. As is well known, a video signal is frequency modulated for recording on magnetic tape. Due to the non-linear characteristics of magnetic tape, the reproduced frequency modulated video signal is somewhat distorted. Therefore, the envelope of the frequency modulated video signal is influenced by the content of the video information. Further, the input to envelope detecting circuit 34 is usually derived from a playback equalizer (not shown) so that the signal envelope may also be affected by the playback equalization with reference to the content of the video information. By reason of the foregoing, if the output of detecting circuit 34 is continuously applied through filter 35 to the respective input of multiplier 37, the information thus applied to multiplier 37 for detecting tracking error is somewhat erroneous in that it is influenced by the content of the video information being reproduced. However, when the output of detecting circuit 34 is sampled only at the horizontal synchronizing portions of the reproduced signals, as in the sample and hold circuit 100 on FIG. 11, the content of the video information does not affect the samples of the detected envelope, and, therefore, the tracking error is accurately derived.

The tracking control system according to this invention may be applied to the type of VTR having a pair of video heads which are circumferentially arranged at 180° intervals on the rotational drum, in addition to the single head VTR shown on FIGS. 1A and 1B.

Having described illustrative embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for reproducing information signals recorded in successive parallel tracks on a record medium, comprising:

transducer means movable in a direction generally along the tracks for reproducing the signals recorded therein;

transducer deflecting means supporting said transducer means and being operative, in response to application of an electrical drive signal to said transducer deflecting means, for deflecting said transducer means in a direction transverse to said direction along the tracks;

head movement detecting means for providing a head movement signal indicating all movements of said transducer means in said transverse direction;

means for providing a dithering signal;

means for providing a head position and track selection control signal;

means for generating a track following error signal; and means for combining said dithering signal, said head position and track selection control signal and said track following error signal to provide therefrom said electrical drive signal which is applied to said transducer deflecting means;

said means for generating the track following error signal including means connected with said transducer means for detecting an envelope of the signals reproduced by said transducer means, means connected with said head movement detecting means and receiving at least said head position and track selection control signal for removing from said head movement signal any components of the latter due to at least said head position and track selection control signal, and means providing said track following error signal by synchronously demodulating the detected envelope of the reproduced signals with the head movement signal from which said components have been removed.

2. An apparatus according to claim 1; in which said means for removing from said head movement signal any components of the latter due to at least said head position and track selection control signal includes adder circuit means having a first input receiving said head movement signal, a second negative input receiving at least said head position and track selection control signal for subtraction from said head movement signal, and an output at which the result of said subtraction is delivered to said means for synchronously demodulating.

3. An apparatus according to claim 2; in which said means for combining the dithering, head position and track selection control and track following error signals includes first adding means combining said head position and track selection control signal with said track following error signal, and second adding means combining said dithering signal with the output of said first adding means and providing said drive signal as an output of said second adding means.

4. An apparatus according to claim 3; in which said output of the first adding means is connected to said negative input of said adder circuit means.

5. An apparatus according to claim 2; in which said negative input of the adder circuit means is connected to said means for providing said head position and track selection control signal in advance of said means for combining.

6. An apparatus according to claim 2; in which said record medium is a magnetic tape having said tracks extending obliquely thereon, said tape extends helically about at least a portion of the periphery of a guide drum and is adapted to be longitudinally advanced, at least a portion of said guide drum is rotatable, and said transducer means includes a magnetic head mounted by means of said transducer deflecting means on said rotatable portion of the guide drum so as to rotate with the latter and thereby scan along a selected one of the tracks positioned in proximity thereto by advancement of the tape.

7. An apparatus according to claim 6; in which said means for synchronously demodulating the detected envelope includes multiplier means having inputs respectively receiving said detected envelope from the envelope detecting means and said result of the subtraction.

8. An apparatus according to claim 6; in which said transducer deflecting means is constituted by a bi-morph leaf which is cantilevered at one end and has said transducer means secured to the other end of said leaf, and said drive signal is applied to said bi-morph lead for flexing the same and thereby causing the deflection in said transverse direction.

9. An apparatus according to claim 8; in which said head movement detecting means includes a strain gauge secured on said bi-morph leaf so as to be stressed in accordance with the flexing of said leaf.

* * * * *